(12) United States Patent
Matsuo

(10) Patent No.: US 12,267,473 B2
(45) Date of Patent: Apr. 1, 2025

(54) INDUSTRIAL PRINTING SYSTEM, PRINT SERVER, AND PROCESSING MANAGEMENT METHOD THAT PRINT PEER-TO-PEER ACCORDING TO ATTRIBUTE OF PRINTING APPARATUS AT DISTRIBUTED DESTINATION IN PRODUCTION PRINTING

(71) Applicant: KYOCERA Document Solutions Inc., Osaka (JP)

(72) Inventor: Taku Matsuo, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/461,277

(22) Filed: Sep. 5, 2023

(65) Prior Publication Data

US 2025/0080677 A1   Mar. 6, 2025

(51) Int. Cl.
*H04N 1/32* (2006.01)
(52) U.S. Cl.
CPC ..... *H04N 1/32545* (2013.01); *H04N 1/32523* (2013.01)
(58) Field of Classification Search
CPC ................. H04N 1/32545; H04N 1/32523
See application file for complete search history.

(56) References Cited

U.S. PATENT DOCUMENTS

| | | | | |
|---|---|---|---|---|
| 11,204,728 B2 * | 12/2021 | Albers | ................ | G06F 3/1288 |
| 2007/0127064 A1 * | 6/2007 | Kuroshima | ........... | G06F 3/1245 |
| | | | | 358/1.15 |
| 2009/0225355 A1 * | 9/2009 | Kazume | ............. | H04N 1/32545 |
| | | | | 358/1.15 |
| 2015/0156351 A1 | 6/2015 | Yamamoto | | |
| 2016/0124685 A1 * | 5/2016 | Mickeleit | .............. | G06F 3/1288 |
| | | | | 358/1.15 |
| 2017/0024171 A1 * | 1/2017 | Abe | ........................ | G06F 3/124 |
| 2017/0208181 A1 * | 7/2017 | Kim | ..................... | H04N 1/0023 |
| 2018/0114103 A1 * | 4/2018 | Fukami | ................. | G06F 3/1253 |
| 2018/0210688 A1 * | 7/2018 | Hattanda | .............. | G06F 3/1292 |

FOREIGN PATENT DOCUMENTS

| | | |
|---|---|---|
| JP | 3726634 B2 | 12/2005 |
| JP | 4689453 B2 | 5/2011 |
| JP | 2015-107555 A | 6/2015 |

* cited by examiner

*Primary Examiner* — Benjamin O Dulaney

(74) *Attorney, Agent, or Firm* — Hawaii Patent Services; Nathaniel K. Fedde; Kenton N. Fedde

(57) ABSTRACT

Provided is an industrial printing system that enables output with the attribute of a printing apparatus at the distributed destination of production printing in a peer-to-peer manner. An attribute acquisition unit acquires other attribute information supported by other printing apparatus at distributed destination. A table generation unit compares acquired other attribute information with own attribute information supported by own printing apparatus to generate a conversion table that is set with a conversion rule for a mismatched attribute. A processing management unit sends the job to the other print server to request for processing based on generated conversion table so that the job is to be printed by the other printing apparatuses.

14 Claims, 10 Drawing Sheets

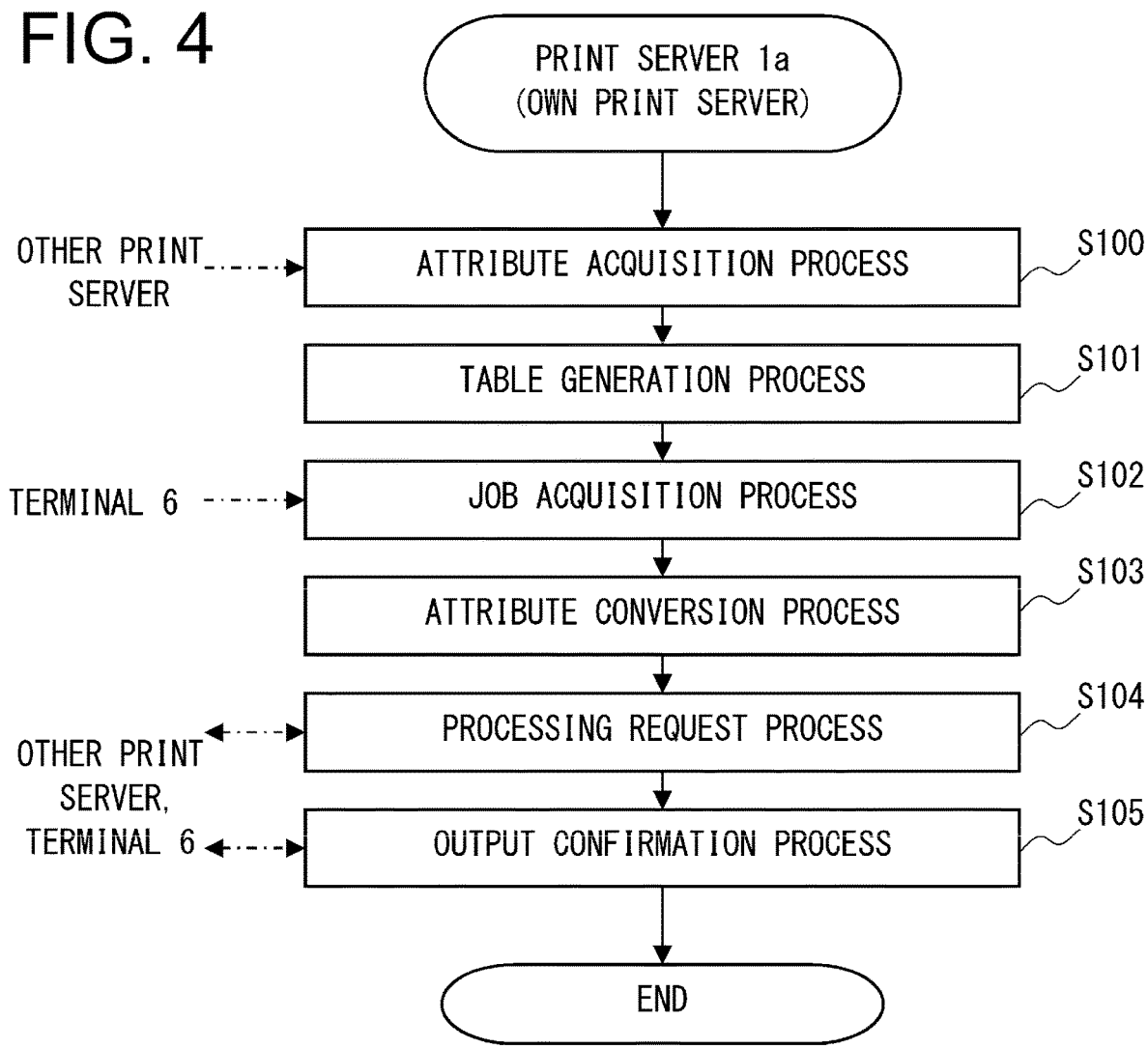

FIG. 5

OTHER ATTRIBUTE INFORMATION 200-2
ACQUIRED FROM PRINTING APPARATUS 1b

```
<paper-supported>
  <paper-type-supported>
    <paper-type syntax="name">
      Standard
      PrePrinted
      Transparency
      Precut tab
      Full cut tab
      Envelope
      Recycled
      Labels
      Film Synthetic
      Textured
      Precut tab - Textured
      Full cut tab - Textured
      Orderd/Sequenced - Textured
      Postcard
      Reload
      Custom
    </paper-type>
  </paper-type-supported>
  <paper-size-supported>
  ....
  </paper-size-supported>
  <paper-color-supported>
  ....
  </paper-color-supported>
</paper-supported>
<finishing-supported>
....
</finishing-supported>
<finishing-supported>
....
</finishing-supported>
```

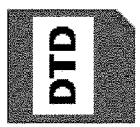
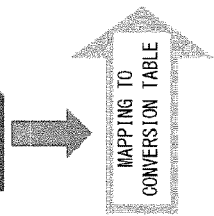

MAPPING TO CONVERSION TABLE

CONVERSION TABLE 220-2

| FOR PRINTING APPARATUS 1b | | |
|---|---|---|
| paper-supported | paper-type-supported | paper-type |
| | | Standard |
| | | PrePrinted |
| | | Transparency |
| | | Precut tab |
| | | Full cut tab |
| | | Envelope |
| | | Recycled |
| | | Labels |
| | | Film Synthetic |
| | | Textured |
| | | Precut tab - Textured |
| | | Full cut tab - Textured |
| | | Orderd/Sequenced - Textured |
| | | Postcard |
| | | Reload |
| | | Custom |

FIG. 7

OTHER ATTRIBUTE INFORMATION 200-2
ACQUIRED FROM PRINTING APPARATUS 1b

```
<paper-supported>
  <paper-type-supported>
    <paper-type syntax="name">
    .....
    </paper-type>
  </paper-type-supported>
  <paper-size-supported>
  .....
  </paper-size-supported>
  <paper-color-supported>
  .....
  </paper-color-supported>
</paper-supported>
<finishing-supported>
.....
</finishing-supported>
<output-bin-supported>
.....
</output-bin-supported>
```

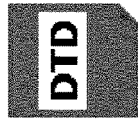

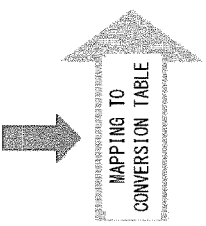

MAPPING TO CONVERSION TABLE

| FOR PRINTING APPARATUS 1b | | | |
|---|---|---|---|
| paper-supported | paper-type-supported | paper-type | ..... |
| | paper-size-supported | x-dimension | ..... |
| | | y-dimension | |
| | paper-color-supported | | ..... |
| finishing-supported | | | |
| output-bin-supported | | | ..... |

CONVERSION TABLE 220-2

INDUSTRIAL PRINTING SYSTEM, PRINT SERVER, AND PROCESSING MANAGEMENT METHOD THAT PRINT PEER-TO-PEER ACCORDING TO ATTRIBUTE OF PRINTING APPARATUS AT DISTRIBUTED DESTINATION IN PRODUCTION PRINTING

BACKGROUND

The present disclosure relates to an industrial printing system, a print server, and a processing management method that perform distributed processing, especially for industrial printing (production printing).

In industrial printing known as production printing, which uses commercial (industrial) printing apparatus, the components of the final product are produced by dividing the work among a plurality of processes. For example, in the case of bookbinding, a cover, a body (color), a body (black and white), a promotional material, a belt, a shipping envelope, and the like are processed as different jobs. Each job is then combined in intermediate processes to produce the final product, the book.

In a typical print system that includes a plurality of printers, there is a print system that performs so-called ubiquitous printing. This system receives a job from a PC that issued the ubiquitous job in a print system that includes a plurality of printers (MFPs). The first MFP stores the print settings in its memory if they can be processed by its own print function, and it forwards the job to the next MFP if they cannot. This process is performed in a predefined order from the first MFP to the Nth MFP. This saves the ubiquitous job in the memory of the MFPs that can process it. As a result, the waiting time for the user to obtain a printed document can be reduced in the printing system.

In other words, in this typical technology, print data (jobs) are transferred to each MFP as they are, and the transferred MFP itself determines whether or not it is capable of processing them.

Here, in the production printing as described above, distributed processing is not always possible with a plurality of units of the same printing apparatus, and in many cases, distributed processing is performed with different models of printing apparatus.

SUMMARY

An industrial printing system of the present disclosure is an industrial printing system for production printing having a plurality of print servers for distributed processing of a job, each of the plurality of print servers includes: an attribute acquisition unit configured to acquire other attribute information supported by other printing apparatus at distributed destination; a table generation unit configured to compare the other attribute information acquired by the attribute acquisition unit with own attribute information supported by own printing apparatus to generate a conversion table that is set with a conversion rule for a mismatched attribute; and a processing management unit configured to send the job to the other print server to request for processing based on the conversion table generated by the table generation unit so that the job is to be printed by the other printing apparatuses.

A print server of the present disclosure is a print server that performs distributed processing of a job in an industrial printing system for production printing, including: an attribute acquisition unit configured to acquire other attribute information supported by other printing apparatus at distributed destination; a table generation unit configured to compare the other attribute information acquired by the attribute acquisition unit with own attribute information supported by own printing apparatus to generate a conversion table that is set with a conversion rule for a mismatched attribute; and a processing management unit configured to send the job to the other print server to request for processing based on the conversion table generated by the table generation unit so that the job is to be printed by the other printing apparatus.

A processing management method of the present disclosure is a processing management method executed by an industrial printing system for production printing having a plurality of print servers that performs distributed processing of a job, including the steps of: acquiring other attribute information supported by other printing apparatus at distributed destination; comparing the acquired other attribute information with own attribute information supported by the own printing apparatus to generate a conversion table that is set with conversion rules for a mismatched attribute; and sending the job to the other print server to request for processing based on the generated conversion table so that the job is to be printed by the other printing apparatus.

BRIEF DESCRIPTION OF THE DRAWINGS

FIG. 4 is a flowchart of a job distribution execution process according to the present disclosure;

FIG. 5 is a conceptual diagram of conversion of other attribute information and conversion tables in the job distribution execution process as shown in FIG. 4;

FIG. 7 is a conceptual diagram of conversion of other attribute information and conversion tables in the job distribution execution process as shown in FIG. 4;

DETAILED DESCRIPTION

Embodiment

[Configuration of Industrial Printing System X]

Figure 1:
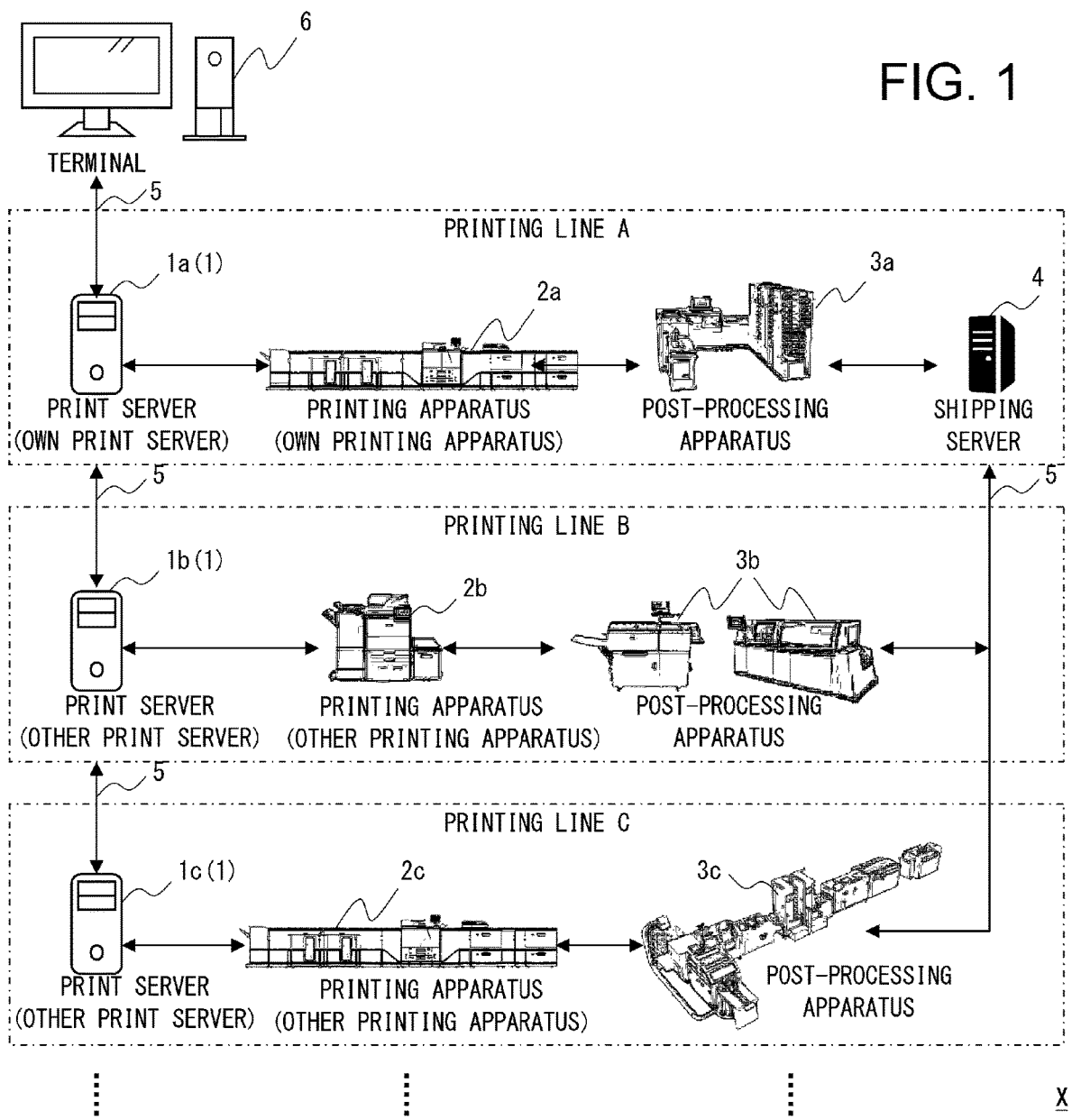
FIG. 1 is an example of a system configuration diagram of an industrial printing system according to the present disclosure.

Firstly, with reference to FIG. 1, an example of the overall system configuration of the industrial printing system X according to the present embodiment is described.

The industrial printing system X according to the present embodiment is a system for executing output by printing step and post-processing step (hereinafter simply referred to as "printing") in industrial printing (production printing).

Figure 3:
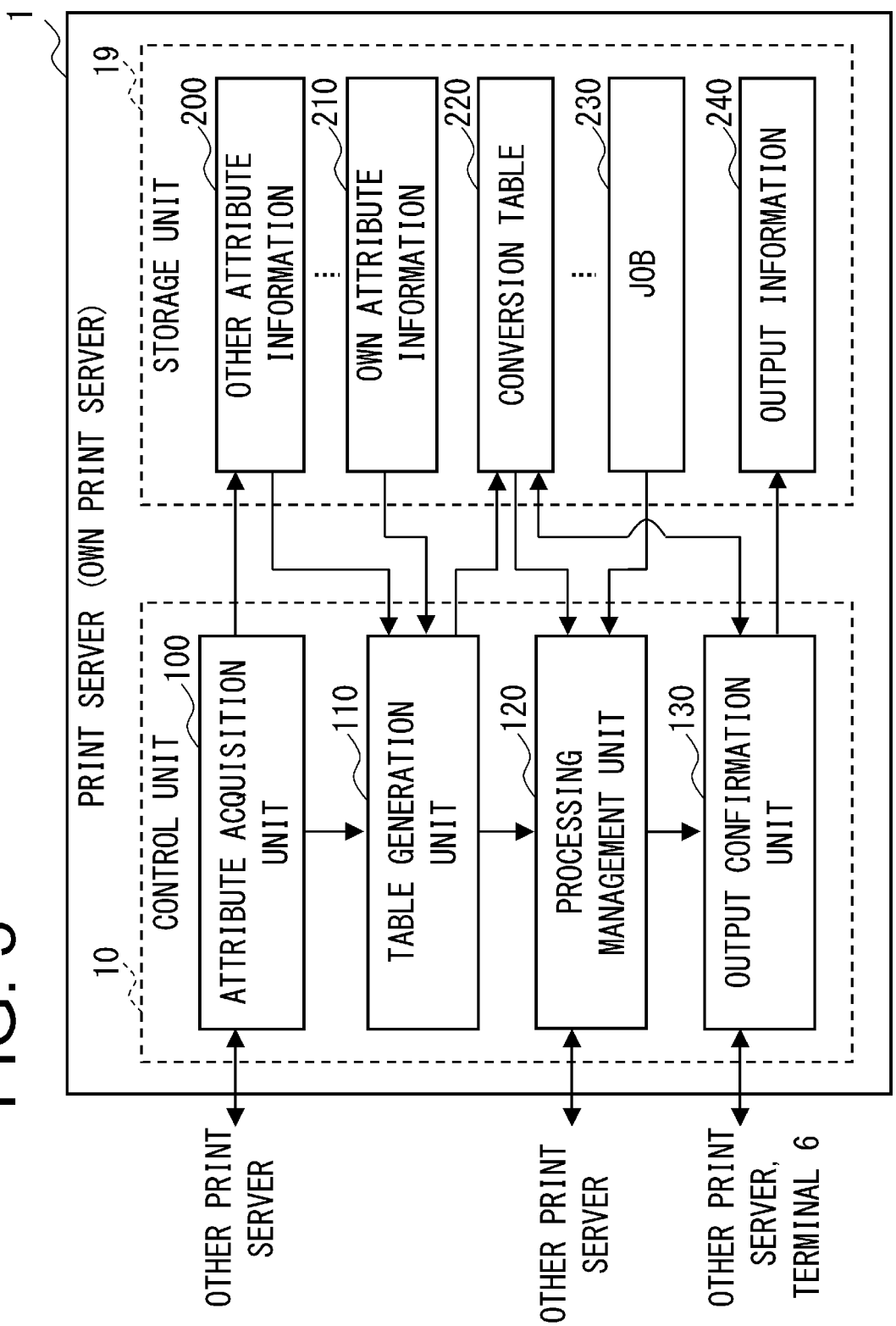
FIG. 3 is a block diagram showing a functional configuration of the print server as shown in FIG. 1.

Here, in the industrial printing system X according to the present embodiment, the final product, such as a book to be output, is referred to as an "order," and each component of the order is referred to as a job 230 (as refer to FIG. 3).

In the industrial printing system X, sites (printing lines), which are printing companies, printing plants, or the like, including a print server 1 and component apparatuses (a group), which includes a printing apparatus 2, a post-processing apparatus 3, and a shipping server 4, or the like, are connected with a network 5 and coordinated. In addition, a terminal 6 is connected to the print server 1.

In FIG. 1, an example of this coordination between sites is shown in which print servers 1*a*, 1*b*, 1*c*, . . . of printing lines A, B, C, . . . , as well as a shipping server 4 of printing line A, are connected with the network 5 is described. Further, in this example, in the printing lines A, B, C, . . . , printing apparatuses 2*a*, 2*b*, 2*c*, . . . , and post-processing apparatuses 3*a*, 3*b*, 3*c*, . . . , are connected with the print servers 1*a*, 1*b*, 1*c*, . . .

Hereafter, when any one of these print servers 1*a*, 1*b*, 1*c*, . . . is indicated, it is referred to simply as the print server 1. Similarly, when any one of these the print servers 2*a*, 2*b*, 2*c*, and . . . is indicated, it is referred to simply as print server 2. Similarly, when any one of the post-processing apparatuses 3*a*, 3*b*, 3*c*, . . . is indicated, it is simply referred to as the post-processing apparatus 3.

The print server 1 is an information processing apparatus that serves as a print controller, which manages and controls printing-related apparatuses including the printing apparatus 2 and the post-processing apparatus 3 provided at each site (hereinafter referred to as "component apparatuses"). The print server 1 is configured as a PC (Personal Computer) server, a dedicated machine, a general-purpose machine, or the like.

In the present embodiment, the print server 1 performs peer-to-peer distributed processing for a job 230 (FIG. 3) in production printing by executing an application software (hereinafter simply referred to as an "application") for dedicated print management. This print management application (hereafter referred to as the "dedicated application") may run a common platform to perform for creating print designs, user management, tenant management, security management, maintenance notification services, prepress process management, storage management for each document, management of the printing apparatuses 2 and the post-processing apparatuses 3, and the like.

Specifically, in production printing, the print server 1 sends and receives various instructions and information to and from the printing apparatus 2, post-processing apparatus 3, and shipping server 4, or the like. In this way, the print server 1 manages the status of each apparatus and requests the processing of the job 230. Furthermore, each print server 1 can be accessed by a user, such as an administrator a printing operator, or the like of the industrial printing system X by using a web browser, terminal, or dedicated application, from the terminal 6, and the like.

In the present embodiment, the print server 1 that requests distributed processing is hereinafter referred to as the "own print server." On the other hand, the print server 1 to which the distributed processing is requested (distributed destination) is hereinafter referred to as the "other print server." That is, the own print server requests processing to the other print server, assigns processing of the job 230 to each component apparatus, and causes the processing to be executed.

The printing apparatus 2 is an automated printing apparatus, or the like, that executes processing of a printing step. The printing apparatus 2 may be an industrial printer including an image forming apparatus for printing in small lots, an offset printing apparatus for printing in large quantities (multiple lots), or the like.

The model and the manufacturer (hereinafter simply referred to as the "manufacturer") of the printing apparatus 2 at each of the sites according to the present embodiment may be different from each other. The printing apparatuses 2 may also differ in the size, paper quality, recordable range, color profile, or the like for the recording paper used in the printing step.

In the present embodiment, the printing apparatus 2 that is connected to and managed by the own print server is hereinafter referred to as "own printing apparatus." On the other hand, printing apparatus 2 connected to and managed by the other print server is hereinafter referred to as the "other printing apparatus."

The post-processing apparatus 3 is a post-processing apparatus for executing post-processing processes such as folding, collating, binding, cutting, binding, and the like of recording paper printed by printing apparatus 2.

In the post-processing apparatus 3 according to the present embodiment at each site, the contents, ranges, and the like of processes that can be executed in the post-processing step may be different.

The shipping server 4 is a server that manages shipping of an order sent from each site after the printing step or post-processing step has been completed.

Although in the present embodiment, it describes an example by using the shipping server 4 at Company A's site, other sites may also be equipped with a shipping server 4.

The network 5 can be a local area network (LAN), wireless LAN (Wi-Fi), wide area network (WAN), cellular phone network, industrial network, voice telephone network, other dedicated line, or the like. The network 5 can send and receive various commands and data to and from each apparatus. Furthermore, the print server 1 and each component apparatus may also be connected via a LAN, or the like, of the network 5. Additionally, the network 5 may be set up as a VPN (Virtual Private Network), or the like.

The terminal 6 is an information processing apparatus such as a PC, a smartphone, a tablet terminal, a PDA (Personal Data Assistant), or the like. The terminal 6 can be used by the user to control printing. In the present embodiment, terminal 6 checks the result, which the job 230 distributed to printing apparatus 2 is executed, sets the conversion table 220 (FIG. 3), and the like.

In addition, the terminal 6 can also run applications that control the design and prepress of production printing. In addition, the terminal 6 may be connected with the other terminal for submission, design proofing, or the like, for the design and prepress. Additionally, the terminal 6 may be provided with a function of a management apparatus that manages the processing requests for each apparatus by print server 1. This makes it possible to acquire the job 230, design and submit a print, manage prepress processing, perform checking progress status and a processing request, and the like.

In the following example, the print server 1*a* of printing line A (site) is the own printing server on the processing request side (distributed source). In this example, the printing apparatus 2*a* connected to print server 1*a* becomes the own printing apparatus that has grasped the output enable attribute in the print server 1*a*.

On the other hand, print server 1*b* at printing line B and print server 1*c* at printing line C are the other print servers on the side where processing is requested (distributed destination). Therefore, printing apparatuses 2b and 2c connected with them become the other printing apparatuses, respectively.

In addition, there may be a plurality of these apparatuses depending on the application, scale of printing, or the like. Each apparatus can be connected with the print server 1 by various protocols via the network 5, LAN, and the like. Alternatively, the print server 1 and each apparatus may be directly connected by wired lines by using various interfaces.

In addition, each site may be provided with the other component apparatuses managed by the print server 1. These other component apparatuses include, for example, a terminal for submission, design proofing, prepress apparatus, or the like.

[Control Configuration of Print Server 1]

Figure 2:
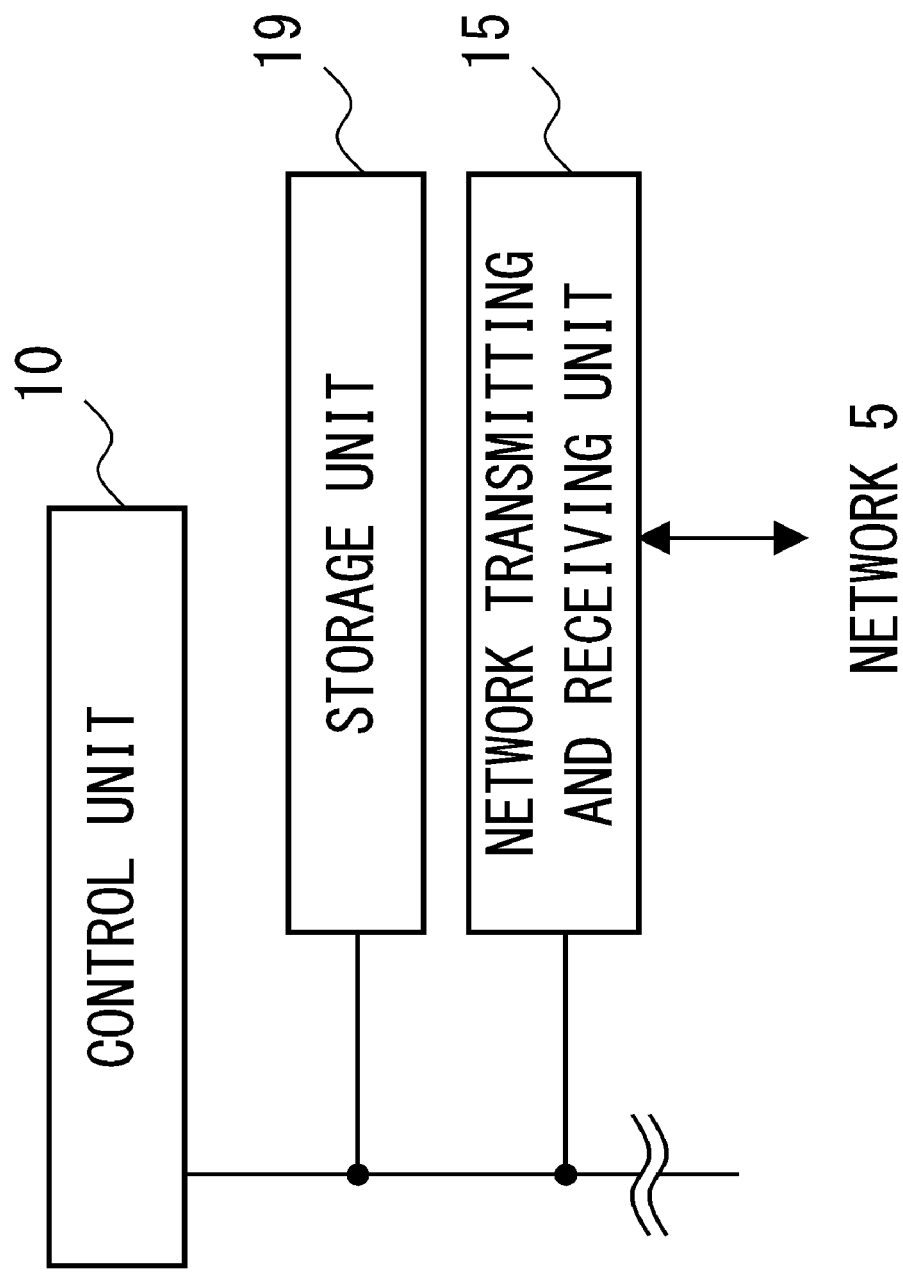
FIG. 2 is a block diagram showing a control configuration of the print server as shown in FIG. 1.

Next, with reference to FIG. 2, a control configuration of the print server 1 is described.

The print server 1 includes a control unit 10, a network transmitting and receiving unit 15, and a storage unit 19. Each unit is connected with the control unit 10 and its operation is controlled by the control unit 10.

The control unit 10 is an information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit or Application Specific Processor), or the like.

The control unit 10 is made to operate as each of the functional blocks as described later by reading the control program stored in the ROM or HDD of the storage unit 19, expanding this control program into the RAM, and executing it. Also, the control unit 10 controls the entire apparatus according to the instruction information input from the terminal 6, or the like.

The network transmitting and receiving unit 15 is a network connection unit that includes a LAN board, a wireless transmitting and receiving unit, or the like, for connecting with the network 5.

The network transmitting and receiving unit 15 transmits and receives data on data communication lines and voice signals on voice telephone lines.

The storage unit 19 is a non-transitory recording medium, which is a semiconductor memory such as ROM (Read Only Memory) or RAM (Random Access Memory), an HDD (Hard Disk Drive), and the like.

The ROM and HDD of storage unit 19 store the control program for controlling the operation of the print server 1. This control program includes the operating system (OS), middleware on the OS, services (daemons), various applications, database data, and the like. Among these, the various applications include the printing process management application as described above.

In addition, the storage unit 19 may also store account settings, other data, or the like, for users of the industrial printing system X.

In addition, in the print server 1, the control unit 10 may be integrally formed, such as a CPU with a built-in GPU, a chip-on-module package, a SOC (System On a Chip), or the like.

The control unit 10 may also have RAM, ROM, flash memory, or the like.

[Functional Configuration of Print Server 1]

Here, with referring to FIG. 3, a functional configuration of the print server 1 is described.

The control unit 10 of the print server 1 provides an attribute acquisition unit 100, a table generation unit 110, a processing management unit 120, and an output confirmation unit 130.

The storage unit 19 stores other attribute information 200, own attribute information 210, conversion table 220, a job 230, and output information 240.

The attribute acquisition unit 100 acquires the other attribute information 200 supported by the other printing apparatuses at distributed destination.

Alternatively, the attribute acquisition unit 100 can share own attribute information 210 or the other attribute information 200 by peer-to-peer among the print servers 1.

The table generation unit 110 compares the other attribute information 200 obtained by the attribute acquisition unit 100 with the own attribute information 210 supported by the own printing apparatus. At this time, the table generation unit 110 acquires instructing specification data from the other attribute information 200. The instructing specification data indicates the attribute of a function supported by the other printing apparatus (hereinafter simply referred to as "supported attribute") and the method of instructing the function (unit, direction, type, or the like). Then, the table generation unit 110 detects an attribute that is mismatched from the supported attribute of the own attribute information 210 (hereinafter simply referred to as "mismatched attribute") in the attribute of the other attribute information 200 and its instructing specification. The table generation unit 110 generates a conversion table 220 in which a conversion rule for this mismatched attribute is set.

Here, if the table generation unit 110 has already set the conversion rule for the printing apparatus 2 of the same manufacturer as the other printing apparatus, it may generate the conversion table 220 based on that conversion rules.

Further, the table generation unit 110 may set up conversion rules to convert values based on the changed instructing specification of the attribute if the instructing specification of the attribute is different between the other attribute information 200 and the own attribute information 210.

The table generation unit 110 may also share the conversion table 220 among peer-to-peer connected print servers 1. In this case, the table generation unit 110 may use the conversion rule of the print server 2 of the same manufacturer as a conversion candidate.

The processing management unit 120 sends the job 230 to the other print server to be printed by the other printing apparatus based on the conversion table 220 generated by the table generation unit 110, and it requests processing. In other words, the processing management unit 120 converts the attribute of the job 230 based on the conversion table 220 for the other printing apparatus at the distributed destination, and it sends the converted job 230 to the other print server. In this case, the processing management unit 120 may encrypt the job 230 and send it.

Furthermore, the processing management unit 120 can send and receive a processing status notification and a completion notification for the job 230 between the print servers 1 corresponding to the combination to manage the processing of the job 230.

The output confirmation unit 130 acquire the output information 240 from the other printing apparatus at the time of printing, and it enables to confirm whether there is a problem with conversion.

Specifically, the output confirmation unit 130 can output the output information 240 to the terminal 6 for the user to confirm.

Furthermore, if changes cannot be made based on the conversion table 220, the output confirmation unit 130 can present the user with the conversion table 220 and ask for fixing.

The other attribute information 200 is data indicating supported attribute and its instructing specification for the step of printing process (printing step) for the component apparatus provided at the site managed by the other print server. Furthermore, the other attribute information 200 may also include data of supported attribute and its instructing specifications for the post-processing process (post-processing step) by the post-processing apparatus 3.

In the present embodiment, the other attribute information 200 may be shared among the print servers 1. That is, each print server 1 may mutually store in the storage unit 19 the other attribute information 200 corresponding to the other printing apparatus at each site where cooperation is possible.

The own attribute information 210 is data indicating the supported attribute of the printing apparatus 2 connected with the own print server and its instructing specification. When the own attribute information 210 is shared with other print server, it is stored in such the other print server as the other attribute information 200.

The conversion table 220 is data with conversion rules for mismatched attribute. Based on the conversion table 220, the attribute in the job 230 is converted so that they can be executed by other printing apparatuses. That is, the conversion table 220 is setting data for transliterating and converting print instruction attribute in the job 230 for other printing apparatuses. The conversion table 220 may be, for example, data mapping the correspondence between an attribute and a name to be converted with its conversion rule, or the like, by a table, macro language, or the like. Here, in the conversion table 220, the conversion rule of the mismatched attribute may be set by the user. Also, this setting may be performed based on a print work instruction document, or the like, which includes whether or not the print instruction attribute can be changed. Furthermore, a plurality of conversion tables 220 may be set for each manufacturer and each model.

The job 230 is data in which various data used at the time of printing in production printing are collected. The job 230 may be described, for example, in JDF (Job Description Format) and/or JMF (Job Messaging Format).

The job 230 may include data of a print manuscript with a design set according to the order, a job ticket containing print instruction attribute for requesting the job 230 itself, and information on various resources required for print instructions, such as color profiles, spot colors, fonts, or the like. In addition, job 230 may include rasterized image data.

The output information 240 is data indicating the attribute of the job 230, which has been printed by the other printing apparatus. The output information 240 may be, for example, the used print instruction attribute obtained from print result (log) information after printing. By referring to the output information 240 and the conversion table 220, it is possible to confirm whether there is any problem with the conversion or not.

In addition to this, the storage unit 19 may also store schedule information indicating the status of the schedule for the execution of each job 230. As the schedule information, for example, schedules such as availability, tentative reservation of the job 230, and busy of the job 230 may be set in each time zone of the printing step and the post-processing step. The schedule information may also reflect the operating status of each component apparatus, or the like.

Here, the control unit 10 of the print server 1 is made to function as the attribute acquisition unit 100, the table generation unit 110, the process management unit 120, and the output confirmation unit 130 by executing the control program stored in the storage unit 19.

Also, each unit of the print server 1 as described above is a hardware resource that executes the processing management method according to the present disclosure.

In addition, some or any combination of the above functional configurations may be configured in hardware or circuitry by using an IC, a programmable logic, a FPGA (Field-Programmable Gate Array), or the like.

[Job Distribution and Execution Process by Print Server 1]

Next, as refer to FIG. 4 to FIG. 10, a job distribution and execution process by the print server 1 according to the present disclosure is described.

In the job distribution and execution process, the other attribute information 200 supported by the other printing apparatuses at the distributed destination is acquired. The acquired other attribute information 200 is then compared with the own attribute information 210 supported by the own printing apparatus, and the conversion table 220 that is set with conversion rules for mismatched attribute is generated. Based on this generated conversion table 220, a job 230 is converted and sent to the other print server to be printed by the other printing apparatus.

In the job distribution execution process according to the present embodiment, an example is described in which mainly the control unit 10 of the print server 1a, which is the own print server, executes the program stored in the storage unit 19 in cooperation with each unit and by using hardware resources.

In the following, with reference to the flowchart in FIG. 4, the details of the job distribution execution process are explained step by step.

(Step S100)

Firstly, the attribute acquisition unit 100 performs an attribute acquisition process.

The attribute acquisition unit 100 acquires the other attribute information 200 supported by other printing apparatuses at the distributed destination.

The attribute acquisition unit 100 acquires the other attribute information 200 from the other print server that is cooperated and can be selected as the distributed destination for the job 230, and it stores the other attribute information 200 in the storage unit 19. The other attribute information 200 includes the support attribute in the other printing apparatus connected with the other print server and its instructing specification.

(Step S101)

Then, the table generation unit 110 performs a table generation process.

The table generation unit 110 compares the other attribute information 200 with the own attribute information 210 to generate the conversion table 220 that is set with a conversion rule for mismatched attribute.

Figure 6:
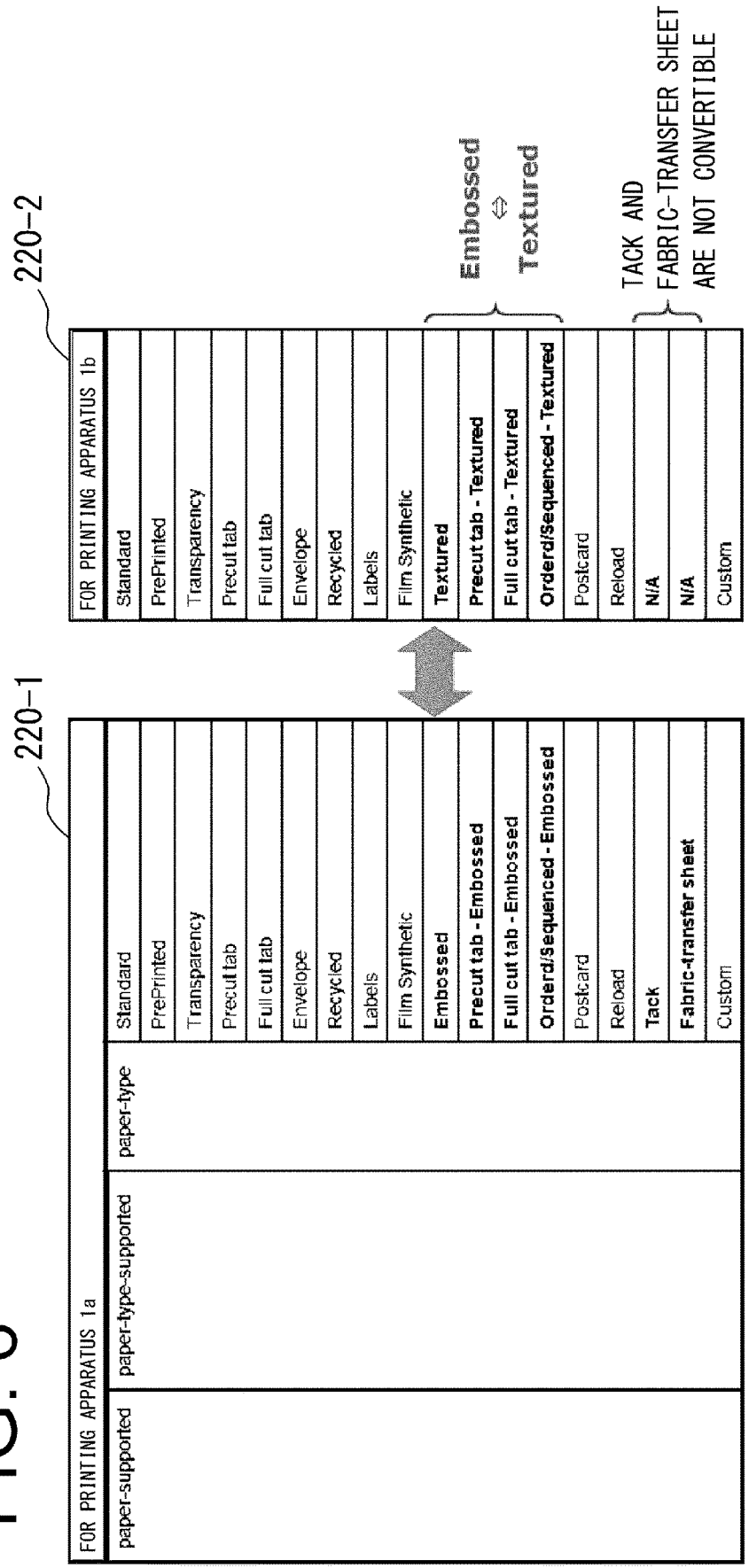
FIG. 6 is a conceptual diagram of comparison of conversion tables in the job distribution execution process as shown in FIG. 4.

As explained by FIGS. 5 and 6, the table generation unit 110 maps the supported attribute and their instructing specifications of the other attribute information 200 to the conversion table 220 on an attribute-by-attribute basis, based on the DTD (Document Type Definition), which is configuration data that is set with attribute definitions, or the like. In the example in FIG. 5, the mapping is performed from the other attribute information 200-2 for printing apparatus 2b, which is an example of the other printing apparatus, to the conversion table 220-2.

On this basis, the table generation unit 110 identifies the difference in supported attribute between the own printing apparatus and the other printing apparatuses as the distributed destination.

In the example in FIG. 6, for example, the table generation unit 110 maps the own attribute information 210 for the own printing apparatus to the conversion table 220-1. The table generation unit 110 compares it to the conversion table 220-2 for the other printing apparatus.

Here, in case that support attribute and its instructing specification match, the table generation unit 110 does not set it in the conversion table 220. In this case, since no conversion is required, the attribute of the job 230 is instructed to be printed as it is as described later.

On the other hand, the table generation unit 110 sets the conversion rules in the conversion table 220 for the mismatched attribute and mismatched instructing specification.

Firstly, the table generation unit 110 obtains the conversion rules for the mismatched attribute that have already been set and lists them as candidates for setting. For example, in the case of a mismatched attribute that "Embossed" is not in "media-type" in the other attribute information 200, the table generation unit 110 lists the conversion rule for "media-type: Embossed" that has been set as a candidate for the setting.

At this time, if the conversion rule for the printing apparatus 2 of the same model as the other printing apparatus have already been set in the other conversion table 220, the table generation unit 110 generates a conversion table 220 for the other printing apparatus based on the conversion rule. In other words, the table generation unit 110 uses the conversion rule for the printing apparatus 2 of the same model as a candidate for setting.

The table generation unit 110 may also refer to conversion rules between the other printing apparatuses in the other conversion tables 220, or the like, shared with the other print servers connected with peer-to-peer. That is, the conversion rule for the same model combination of conversion source and destination may be used as is. Furthermore, although the combination is not of the same model, if they are of the same manufacturer, they may be used as a conversion candidate. Specifically, if a conversion table 220 of another printing apparatus of the same manufacturer exists, the table generation unit 110 can use it to generate a conversion table 220 with mismatched attribute. In other words, the table generation unit 110 applies the conversion rule set in this other conversion table 220 to the conversion table 220 to be generated. This is because in many cases, print instruction attribute, and the like, are standardized for the same manufacturer.

Specifically, an example in which there are conversion rules for the printing apparatus 2 from model A to model B and from model A to model C is described. Here, if generating the conversion table 220 from model B to model C, the table generation unit 110 can generate conversion rules from model B to model C by using the conversion rules from model A to model B and from model A to model C. Then, the table generating unit 110 can list the conversion rule from the model B to the model C as a setting candidate.

The table generation unit 110 selects attribute values from these setting candidates to generate the conversion rule. In this case, the table generation unit 110 may select the candidates for the settings of these conversion rules according to the order of priority, for example, the user's settings, the same model, the same manufacturer's model, or the other manufacturer's model.

As refer to FIG. 6, for example, the table generation unit 110 generates a rule to convert to "Textured" for "media-type: Embossed". For "media-type: Pre-cut tab-Embossed," the table generation unit 110 generates a rule to convert it to "Pre-cut tab-Textured".

Here, the table generation unit 110 may set the conversion table 220 as not-applied conversion (N/A) if there is no corresponding attribute value such as, for example, "media-type: Tack".

The table generation unit 110 uses these conversion rules to set up the conversion table 220.

Figure 8:
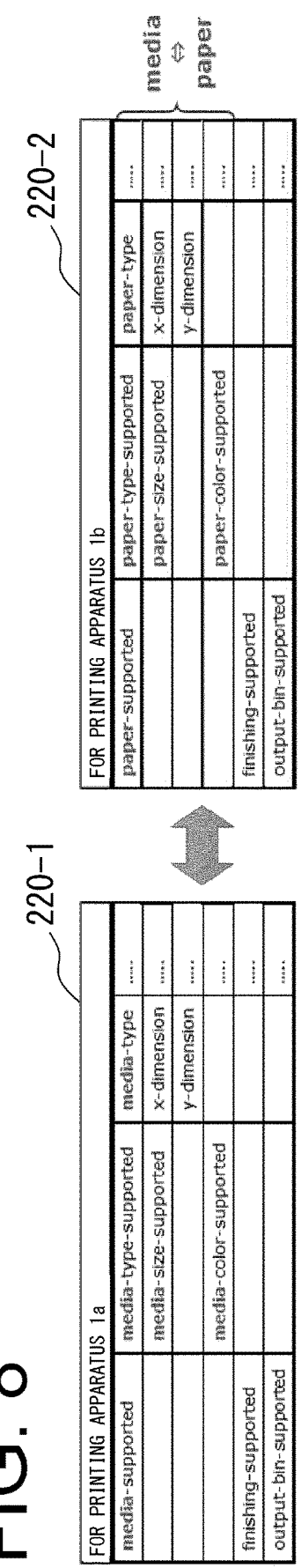
FIG. 8 is a conceptual diagram of comparison of conversion tables in the job distribution execution process as shown in FIG. 4.

As refer to FIGS. 7 and 8, another example of setting a conversion table 220 from a conversion rule is described.

FIG. 7 shows another example that the table generation unit 110 maps from the other attribute information 200-2 to the conversion table 220-2. For example, if there is no "media-size" attribute, but there is a conversion rule for the "media-size" attribute in the other conversion table 220 of the same manufacturer's model, the table generation unit 110 generates this as a conversion rule.

According to FIG. 8, the table generation unit 110 sets this conversion rule in the conversion table 220. For the "media-size" attribute, the table generation unit 110 selects the "paper-size" attribute and sets it as the conversion rule.

In addition, the table generation unit 110 can also set conversion rules for instructing specification after setting conversion rules for mismatched attribute. In other words, if the instructing specification of a supported attribute differs, it is possible to generate a conversion rule that changes the value based on the instructing specification, which is changed.

Figure 9:
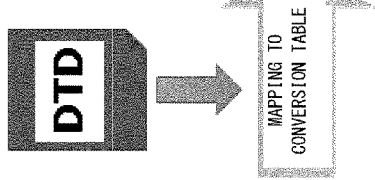
FIG. 9 is a conceptual diagram of the conversion of other attribute information and conversion tables in the job distribution execution process as shown in FIG. 4.
Figure 10:
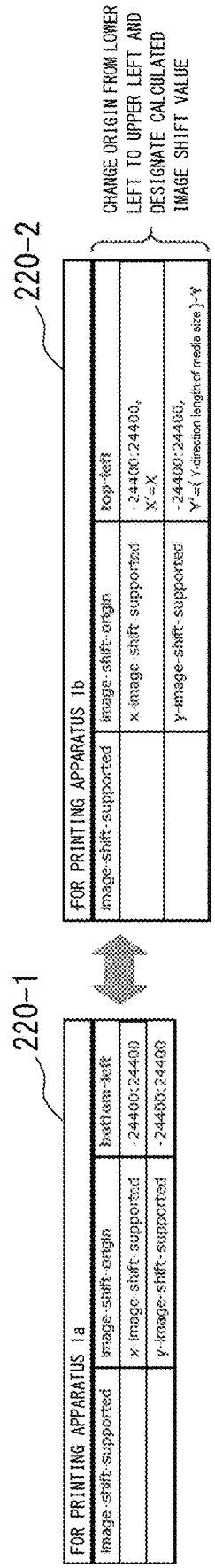
FIG. 10 is a conceptual diagram of the comparison of conversion tables in the job distribution execution process as shown in FIG. 4.

As refer to FIGS. 9 to 10, a setting of conversion rules for an instructing specification is described.

The table generation unit 110 generates a conversion rule for supported attribute with a different instructing specification.

FIG. 9 shows yet another example in which the table generation unit 110 maps the other attribute information 200-2 to the conversion table 220-2. Here, as an example, as an instructing specification, "image-shift-origin" indicating the origin position of image movement is "top-left," "x-image-shift-supported" is set, and a shift value is set as "y-image-shift-supported." This is compared with the conversion table 220-1 of the own printing apparatus to generate a conversion rule.

FIG. 10 shows an example of the table generation unit 110 setting the conversion table 220 according to this conversion rule. In this example, the origin position is changed from lower left to upper left, and the value converted to the movement value at the changed origin position is set as a formula in a macro language. Similarly, it is possible to instruct the rotation direction, or the like, and set the value converted to the changed direction.

Then, the table generation unit 110 may share the generated conversion table 220 with the other print server, which is peer-to-peer connected.

(Step S102)

Then, the table generation unit 110 performs a job acquisition process.

The table generation unit 110 acquires the job 230 targeted to be peer-to-peer distributed and processed from an inter-site management system, an administrator terminal, a prepress apparatus, or the like, which is existed upstream of the industrial printing system X. The job 230 may be created by the web browser or dedicated application of the terminal 6 or the administrator terminal based on the manuscript submitted by the submission terminal. At this time, the manuscript may be presented on a GUI (Graphical User Interface) on the screen of the web browser or the dedicated application to allow the user to set and create the job 230. The table generation unit 110 may automatically generate and include a job ticket containing the settings for each page in the generated job 230. In the present embodiment, the table generation unit 110 may set which printing apparatus 2 is to be distributed destination in each job 230.

In an example in the present embodiment, the print server 1a that acquires this job 230 becomes the own print server (the print server 1 on the processing request side).
(Step S103)

Then, the processing management unit 120 performs an attribute conversion process.

The processing management unit 120 converts the job 230 to be printed in the other printing apparatus based on the conversion table 220.

The processing management unit 120 analyzes the content of the job 230 and refers to attributes. Then, the processing management unit 120 changes the attributes and contents of the job 230 by using the conversion table 220 corresponding to the other printing apparatus of the other print server. The processing management unit 120 converts, for example, the print instruction attribute and the instructing specification in the job 230, the data file, and the like, to generate a job ticket.
(Step S104)

Next, the processing management unit 120 processes a processing request process.

The processing management unit 120 sends the job 230 converted by the conversion table 220 to the other print servers connected to the other printing apparatus on the distributed destination to request processing. Specifically, the processing management unit 120 instructs to transfer the job 230 between the print servers 1 at each site so that the job 230 is processed by the print server 1, the printing apparatus 2, and the post-processing apparatus 3, which are set in the job 230, respectively. As a result, the job 230 is executed for rasterization process, print process, and post-processing process of the job 230 at each site. The processing management unit 120 may instruct the job 230 to be encrypted and transferred between the other print servers.

Furthermore, before and after this processing request and each process, the processing management unit 120 receives a processing status notification and a completion notification for job 230 from the other print server. That means, the processing management unit 120 can manage the processing status and completion of process between the own print server and the other print server that processes the job 230.

Specifically, the processing management unit 120 of the own print server acquires the processing status of rasterization process, printing process, and post-processing process from the other print servers as processing status notifications. These notifications may be broadcasted, or the like, and shared with the other print servers.

Here, the processing management unit 120 can also acquires a preview from the other printing apparatus at the distributed destination at the time of printing to confirm that there is no problem with the conversion.

Specifically, at the time of printing, the other printing apparatus at the distributed destination generates preview image data from job 230 with the specified print instruction attribute. The other print server sends this image data to the own print server.

The processing management unit 120 may receive this image data from the other printing apparatuses at the distributed destination and present it in the GUI of terminal 6 to have the user confirm that there is no problem. In this case, the processing management unit 120 obtains confirmation by the user, and then it notifies the other print server to which the other printing apparatus at the distribution destination is connected that printing is possible. In other words, the other printing apparatus at the distributed destination can proceed with the printing process after receiving the notification that printing is possible.

By processing in this way, the job 230 can be distributed and processed between the own print server, which is the print server 1a on the printing line A, and the other print servers, which are the print server 1b on the printing line B and the print server 1c on printing line C.

On the other hand, if there is a problem with the print image data, that is, an indication that the result is not as expected by the user, the processing management unit 120 may instruct the other print server to cancel the output of the corresponding job 230.

In such a case, the table generation unit 110 may return the process to step S101 above to confirm and instruct the user to change the conversion table 220 by using the GUI of the dedicated application on the terminal 6. Furthermore, when this change is made, the table generation unit 110 may send the changed conversion table 220 from the own print server to the print servers 1 other than the own print server to be shared among them. Furthermore, the processing management unit 120 may resend the job 230 converted with the changed conversion table 220.
(Step S105)

Then, the output confirmation unit 130 performs an output confirmation process.

The output confirmation unit 130 acquires the output information 240, which is output from the other printing apparatus, from the other print server after printing and has the user check at terminal 6 to see if there is any problem with the conversion.

As part of this check, the output confirmation unit 130 first acquires the print instruction attribute at the time of printing from the output information 240 and checks whether there are any differences between the print instruction attribute in the job 230. On this basis, if there is a difference, for example, in a case that the conversion is performed by the conversion table 220 and the printing process is performed, the difference can be notified to the user.

The user can change the conversion table 220 in the same manner as in step S101 above based on the print instruction attribute, the output print data or printed material, the preview image data as described above, and the like. That is, the table generation unit 110 can modify and change the conversion rules set in the conversion table 220 based on the user instruction.

This modified conversion table 220 may be shared among the other print servers peer-to-peer connected, as described above.

Further, the processing management unit 120 of the own print server can also adjust processing requests based on the status of the schedule information.

Furthermore, after these processes are completed, the processing management unit 120 may delete the job 230 sent to the other print server.

This concludes the job distribution execution process according to the present disclosure.

As configured in this way, the following effects can be achieved.

In typical production printing, print processing may be distributed among a plurality of printing apparatuses in order to efficiently process a large number of print jobs. Such distributed processing generally configured with a print server that manages the printing process and a plurality of printing apparatuses.

Here, in the printing step for a printing company, it is not always possible to perform distributed processing with a plurality of printing apparatus of the same model, but it is also possible to perform distributed processing with different models of printing apparatuses.

Thus, when distributed processing is performed on different models of printing apparatuses, the functions supported by each model and the method of indicating those functions are different. This meant that the printing operator had to change the job to accommodate each change.

On the other hand, the industrial printing system X is an industrial printing system for production printing having a plurality of print servers 1 for distributed processing of a job 230, each of the plurality of print servers 1 including: an attribute acquisition unit 100 that acquires other attribute information 200 supported by another printing apparatus at distributed destination; a table generation unit 110 that compares the other attribute information 200 acquired by the attribute acquisition unit 100 with own attribute information 210 supported by own printing apparatus to generate a conversion table 220 that is set with a conversion rule for a mismatched attribute; and a processing management unit 120 that sends the job 230 to the other print server to request for processing based on the conversion table 220 generated by the table generation unit 110 so that the job 230 is to be printed by the other printing apparatus.

By configuring in this way, in production printing, it is possible to convert functions that differ between models during distributed printing in accordance with the other printing apparatus at the distribution destination. Therefore, even printing apparatuses 2 of different models can perform distributed processing. In other words, by generating a conversion table 220 and converting the differences in print instruction attribute between different models, distributed processing can be performed on the other printing apparatus of different model other than the own printing apparatus. This can provide a peer-to-peer typed industrial printing system that enables flexible distributed processing. In addition, since the peer-to-peer type system, a management server is not needed.

In the industrial printing system X according to the present embodiment, the table generation unit 110 generates the conversion table 220 based on a conversion rule when the conversion rule for a printing apparatus 2 of the same manufacturer as the other printing apparatus has already been set.

By configuring the system in this way, even if they are different models, the conversion table 220 can be generated by using the conversion rules of the printing apparatus 2 of the same manufacturer. Thus, the time and effort required to set up the conversion table 220 can be reduced. Specifically, the job 230 itself can be efficiently distributed and processed without having to be changed. Also, even if a new printing apparatus 2 is introduced or a new distributed destination is set, distributed processing can be performed with less effort.

In the industrial printing system X according to the present embodiment, the table generation unit 110 sets, when instructing specification of an attribute is different, a conversion rule to convert values based on the changed instructing specification.

By configuring in this way, it is possible to be handled with a case where the instructing specifications are different even if the supported attributes are the same. For example, even if the coordinate system, value range, value specification, or the like, is different, it can be converted and handled by the conversion table 220.

The industrial printing system X according to the present embodiment further includes an output confirmation unit 130 that acquires output information 240 from the other printing apparatus at the time of printing and enables to confirm whether there is a problem with conversion.

By configuring the system in this way, if the output result differs from the work instructions, or the like, the user can confirm and change the result at the time of printing to obtain a closer output. In other words, by changing the settings of the conversion table 220 itself, the output can be made more reliably similar to that of the own printing apparatus.

In the industrial printing system X according to the present embodiment, the table generation unit 110 shares the conversion table 220 with the print server 1 that is peer-to-peer connected, and the conversion rule of the printing apparatus 2 of the same manufacturer is used as conversion candidates.

By configuring the system in this way, if the conversion table 220 has already been set at the distributed destination, it can be quoted to generate a conversion table 220 for the same manufacturer's model. Thus, the time and effort can be reduced. Furthermore, the conversion table 220 can be unified among the print servers 1 and the output results can be aligned.

Furthermore, the industrial printing system X according to the present embodiment can be configured as each print server 1 simply by storing the other attribute information 200 in the existing print server 1 and installing a dedicated application or the like. Therefore, the processing can be distributed to the printing apparatuses 2 of different models. The print servers 1 can then be linked peer-to-peer. This makes it possible to easily improve the efficiency of production printing by linking with the sites, which are existing companies, and the like.

OTHER EMBODIMENTS

In the above-described embodiment, an example in which the own print server converts the job 230 by using the conversion table 220 has been described.

However, the job 230 may be converted at the other print server by using the conversion table 220. In this case, the appropriate conversion table 220 can be sent from the own print server to the other print server to be converted at the other print server. Alternatively, a configuration is also possible in which the own attribute information 210 is sent to the other print server, the other print server generates an appropriate conversion table 220, and the job 230 is converted. In this case, each print server 1 may retain only the processing requirements of the job 230 and the own attribute information 210 stored in the own storage unit 19.

This configuration allows the jobs 230 to be processed without having to acquire the other attribute information 200 of the other print server, and it is possible to save the trouble of generating and updating the conversion table 220 for each site.

Further, in the above-mentioned embodiment, an example of requesting processing from the other print servers set in the job 230 is described.

However, the other print servers or other printing apparatuses that are requested to process the job 230 may be dynamically changed according to the status notification, completion notification, error notification, or the like, for the job 230. In this case, the job 230 may be converted in the conversion table 220 according to the other printing apparatus that has been altered.

Furthermore, at the time of modification, attribute and instructing specifications that cannot be converted by the conversion table 220 may be ignored if they are not important such as the number of pages, the color profile to be used, or the like.

This configuration allows for more efficient execution of the jobs 230 by distributed processing.

Further, in the embodiment described above, an example by using conversion table 220 for the printing process of job 230 is described.

However, it is also possible to generate a conversion table 220 that converts supported attribute for rasterizing and post-processing other than printing and convert the job 230.

This configuration makes it possible to more efficiently distribute and process the jobs 230 to each site other than printing process.

In the above-mentioned embodiments, an example of distributed peer-to-peer processing is described.

However, each of the processes according to the above embodiment can also be applied in a configuration that uses a management server.

In terms used herein, the singular forms "a," "an," and "the" also include the plural forms unless the context clearly indicates otherwise.

It goes without saying that the configuration and operation of the above-mentioned embodiments are examples, and they may be modified and implemented as appropriate without departing from the aim of the present disclosure.

What is claimed is:

1. An industrial printing system for production printing having a plurality of print servers for distributed processing of a job, each of the plurality of print servers comprising:
an attribute acquisition unit configured to acquire other attribute information supported by another printing apparatus controlled by another print server, wherein the other attribute information indicates a supported attribute and a corresponding instructing specification;
a table generation unit configured to compare the other attribute information acquired by the attribute acquisition unit with own attribute information supported by own printing apparatus to generate a conversion table that is set with a conversion rule when a mismatch exists between the other attribute information and the own attribute information; and
a processing management unit configured to send the job to the other print server to request for processing based on the conversion table generated by the table generation unit so that the job is to be printed by the other printing apparatus; wherein
the table generation unit is configured to map the supported attribute and the instructing specification of the other attribute information to the conversion table on an attribute-by-attribute basis and sets the conversion rule if the mismatch exists and does not set the conversion rule if the mismatch does not exist;
the table generation unit is configured to generate the conversion table based on another conversion rule that has already been set when the other conversion rule that has already been set is for another other printing apparatus of the same manufacturer and not the same model relative to the other printing apparatus; and
the table generation unit is configured to generate a conversion rule from a second model to a third model from: a conversion rule from a first model to the second model and a conversion rule from the first model to the third model.

2. The industrial printing system according to claim 1, wherein
the table generation unit is configured to set, when the instructing specification of an attribute is different, a conversion rule that converts a value based on changed instructing specification; wherein
the instructing specification includes origin position of image movement and rotation direction.

3. The industrial printing system according to claim 1, further comprising:
an output confirmation unit configured to acquire output information from the other printing apparatus at the time of printing and enable to confirm whether there is a problem with conversion; wherein
the output information includes print instruction attribute at time of printing, and
the output confirmation unit is configured to check for differences between print the instruction attribute at the time of printing and print instruction attribute in the job and, when there is a difference, notify of the difference.

4. The industrial printing system according to claim 1, wherein
the table generation unit is configured to share the conversion table with the print server that is peer-to-peer connected, and the conversion rule of the printing apparatus of the same manufacturer is used as conversion candidates; wherein
the conversion table is unified among the plurality of print servers, and output result is to be aligned.

5. The industrial printing system according to claim 4, wherein the table generation unit is configured to select the candidates for setting the conversion rules according to an order of priority in the order of user's setting, same model, same manufacturer's model, or other manufacturer's model.

6. The industrial printing system according to claim 1, wherein
the processing management unit is configured to acquire preview image data of the job with specified print instruction attribute from the other print server and obtains confirmation by a user before notifying the other print server that printing the job is allowable.

7. A print server that performs distributed processing of a job in an industrial printing system for production printing, comprising:
an attribute acquisition unit configured to acquire other attribute information supported by another printing apparatus controlled by another print server, wherein the other attribute information indicates a supported attribute and a corresponding instructing specification;
a table generation unit configured to compare the other attribute information acquired by the attribute acquisition unit with own attribute information supported by own printing apparatus to generate a conversion table that is set with a conversion rule for when a mismatch exists between the other attribute information and the own attribute information; and
a processing management unit configured to send the job to the other print server to request for processing based on the conversion table generated by the table generation unit so that the job is to be printed by the other printing apparatus wherein
the table generation unit is configured to map the supported attribute and the instructing specification of the other attribute information to the conversion table on an attribute-by-attribute basis and sets the conversion rule if the mismatch exists and does not set the conversion rule if the mismatch does not exist;

the table generation unit is configured to generate the conversion table based on another conversion rule that has already been set when the other conversion rule that has already been set is for another other printing apparatus of the same manufacturer and not the same model relative to the other printing apparatus;

the table generation unit is configured to generate a conversion rule from a second model to a third model from: a conversion rule from a first model to the second model and a conversion rule from the first model to the third model.

8. The print server according to claim 7, wherein the table generation unit is configured to set, when the instructing specification of an attribute is different, a conversion rule that converts a value based on changed instructing specification; wherein the instructing specification includes origin position of image movement and rotation direction.

9. The print server according to claim 7, further comprising:

an output confirmation unit configured to acquire output information from the other printing apparatus at the time of printing and enable to confirm whether there is a problem with conversion; wherein the output information includes print instruction attribute at time of printing, and the output confirmation unit is configured to check for differences between print the instruction attribute at the time of printing and print instruction attribute in the job and, when there is a difference, notify of the difference.

10. The print server according to claim 7, wherein the table generation unit is configured to share the conversion table with the print server that is peer-to-peer connected, and the conversion rule of the printing apparatus of the same manufacturer is used as conversion candidates; wherein the conversion table is unified among a plurality of print servers, and output result is to be aligned.

11. A processing management method executed by an industrial printing system for production printing having a plurality of print servers that performs distributed processing of a job, comprising the steps of:

acquiring other attribute information supported by another printing apparatus controlled by another print server, wherein the other attribute information indicates a supported attribute and a corresponding instructing specification;

comparing the acquired other attribute information with own attribute information supported by an own printing apparatus to generate a conversion table that is set with conversion rules when a mismatch exists between the other attribute information and the own attribute information; and sending the job to the other print server to request for processing based on the generated conversion table so that the job is to be printed by the other printing apparatus;

wherein the step of comparing the acquired other attribute information with own attribute information supported by the own printing apparatus to generate a conversion table that is set with conversion rules when a mismatch exists between the other attribute information and the own attribute information comprises mapping the supported attribute and the instructing specification of the other attribute information to the conversion table on an attribute-by-attribute basis and setting the conversion rules if the mismatch exists and does not set the conversion rule if the mismatch does not exist;

generating the conversion table based on another conversion rule that has already been set when the other conversion rule that has already been set is for a printing apparatus of the same manufacturer and not the same model relative to the other printing apparatus, wherein the other conversion rule is a conversion rule from a second model to a third model, and wherein the other conversion rule is generated by a step comprising generating the other conversion rule from: a conversion rule from a first model to the second model and a conversion rule from the first model to the third model.

12. The processing management method according to claim 11, further comprising a step of:

setting, when instructing specification of an attribute is different, a conversion rule that converts a value based on changed instructing specification; wherein the instructing specification includes origin position of image movement and rotation direction.

13. The processing management method according to claim 11, further comprising a steps of:

acquiring output information from the other printing apparatus at the time of printing and enabling to confirm whether there is a problem with conversion; wherein the output information includes print instruction attribute at time of printing; and enabling to confirm whether there is a problem with conversion comprises checking for differences between print the instruction attribute at the time of printing and print instruction attribute in the job and, when there is a difference, notifying of the difference.

14. The processing management method according to claim 11, further comprising a step of:

sharing the conversion table with the print server that is peer-to-peer connected, and the conversion rule of the printing apparatus of the same manufacturer is used as conversion candidates; wherein the conversion table is unified among the plurality of print servers, and output result is to be aligned.

\* \* \* \* \*